(12) United States Patent
Palfai et al.

(10) Patent No.: US 8,438,732 B2
(45) Date of Patent: May 14, 2013

(54) METHOD OF ASSEMBLING A DIFFERENTIAL GEARSET

(75) Inventors: Balazs Palfai, Fishers, IN (US); Attila Nagy, Fishers, IN (US); Andrew Meyer, Fortville, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 372 days.

(21) Appl. No.: 12/950,489

(22) Filed: Nov. 19, 2010

(65) Prior Publication Data

US 2012/0124837 A1 May 24, 2012

(51) Int. Cl.
*B21D 53/28* (2006.01)
*B21K 1/30* (2006.01)
*B23P 15/14* (2006.01)
*F16H 48/06* (2006.01)
*F16H 48/20* (2006.01)

(52) U.S. Cl.
USPC ............ 29/893.1; 29/893; 475/230; 475/231; 475/150

(58) Field of Classification Search .................. 29/893.1, 29/893.2; 475/150, 220, 230, 242, 246, 231
See application file for complete search history.

(56) References Cited

U.S. PATENT DOCUMENTS

| 2011/0143879 A1* | 6/2011 | Vogel et al. | 475/230 |
| 2012/0129645 A1* | 5/2012 | Palfai et al. | 475/150 |

* cited by examiner

*Primary Examiner* — David Bryant
*Assistant Examiner* — Jun Yoo
(74) *Attorney, Agent, or Firm* — Cantor Colburn LLP

(57) ABSTRACT

A method of assembling a differential gear set includes installing a first bushing into a carrier, installing a second bushing into the carrier, and inserting a first planet gear into an interior portion of the carrier. The first planet gear includes a first planet gear shaft. A second planet gear including a second planet gear shaft is inserted into the interior portion of the carrier. The first and second planet gear shafts are installed into the first and second bushings. A third planet gear including a third planet gear shaft is inserted into the interior portion of the carrier and a fourth plant gear including a fourth planet gear shaft is inserted into the interior portion of the housing. The third and fourth planet gear shafts are passed into corresponding bushing receptors in the carrier. Third and fourth bushings are installed on the third and fourth planet gear shafts.

12 Claims, 5 Drawing Sheets

METHOD OF ASSEMBLING A DIFFERENTIAL GEARSET

BACKGROUND OF THE INVENTION

Exemplary embodiments pertain to the art of differential gear sets and, more particularly, to a method of assembling a differential gear set.

Engineers are exploring various methods to save weight and space in the design and construction of motor vehicles. In addition to weight and space concerns, engineers are investigating various propulsion systems to replace and/or augment fossil fuels. One current area of investigation is the use of electric powered vehicles. In an electric powered vehicle, space and weight is of great concern. Lowering component weight will lead to an enhanced operational envelope for electric motors. That is, the less weight the electric motor must move, the more energy can be devoted to moving the vehicle and prolonging operational time.

Drive train components such as motors, transmissions, differentials, and the like, require a considerable amount of power to operate. Drive components typically include large housings that support multiple gears, bearings and shafts. The large housings allow for proper assembly, adjustment of the gears to ensure desired clearances, and maintenance. Component weight, interaction between gears, rotation between bearings and other frictional loading represent a significant energy draw on a power system.

BRIEF DESCRIPTION OF THE INVENTION

Disclosed is a method of assembling a differential gear set. The method includes installing a first bushing into a bushing receptor formed in a side wall of a carrier, installing a second bushing into a bushing receptor formed in the side wall of the carrier, inserting a first planet gear into an interior portion of the carrier. The first planet gear includes a first planet gear shaft and a first plurality of planet gear teeth. The first planet gear shaft is guided into the first bushing. A second planet gear is inserted into the interior portion of the carrier. The second planet gear includes a second planet gear shaft and a second plurality of planet gear teeth. The second planet gear shaft is guided into the second bushing. A third planet gear is inserted into the interior portion of the carrier. The third planet gear includes a third planet gear shaft and a third plurality of planet gear teeth. The third planet gear shaft is passed into a third bushing receptor formed in the side wall of the carrier. A fourth plant gear is inserted into the interior portion of the housing. The fourth planet gear includes a fourth planet gear shaft and a fourth plurality of planet gear teeth. The fourth planet gear shaft is passed into a fourth bushing receptor formed in the side wall of the housing, and a third bushing is installed into the third bushing receptor about the third planet gear shaft and a fourth bushing is installed into the fourth bushing receptor about the fourth planet gear shaft to establish a differential gear set.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
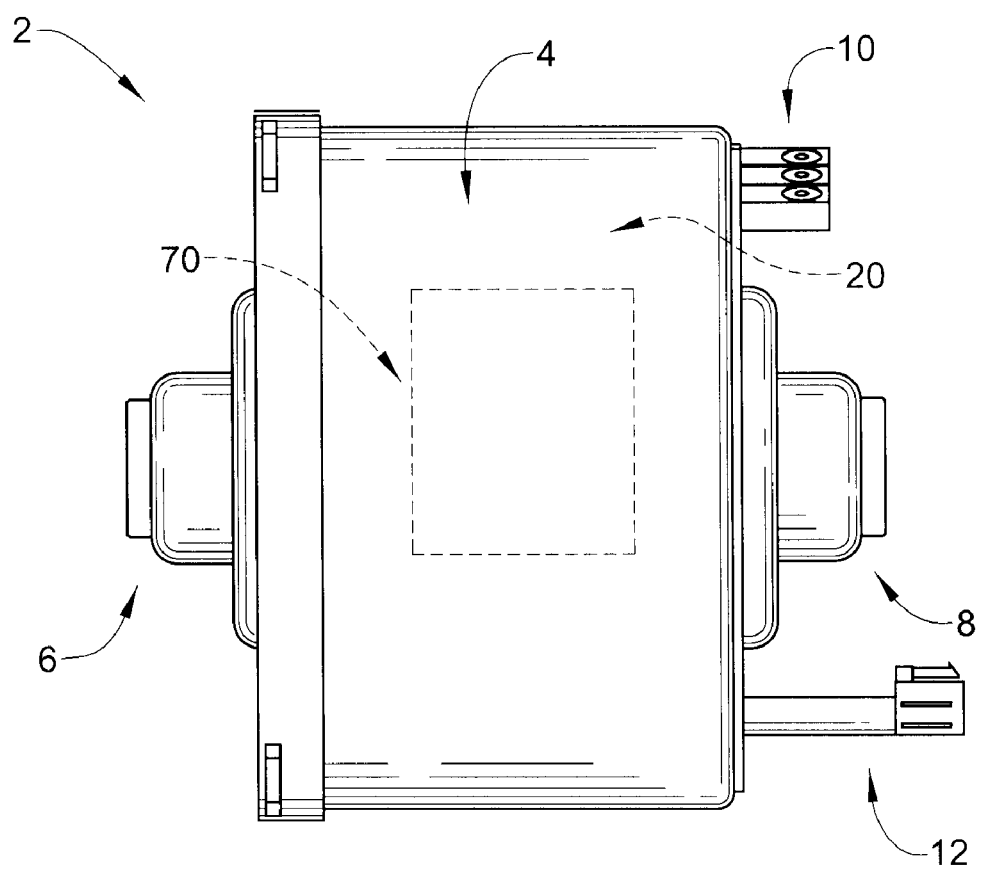
FIG. 1 depicts a perspective view of an electric machine including a transmission member having a differential gear set assembled in accordance with an exemplary embodiment.
Figure 2:
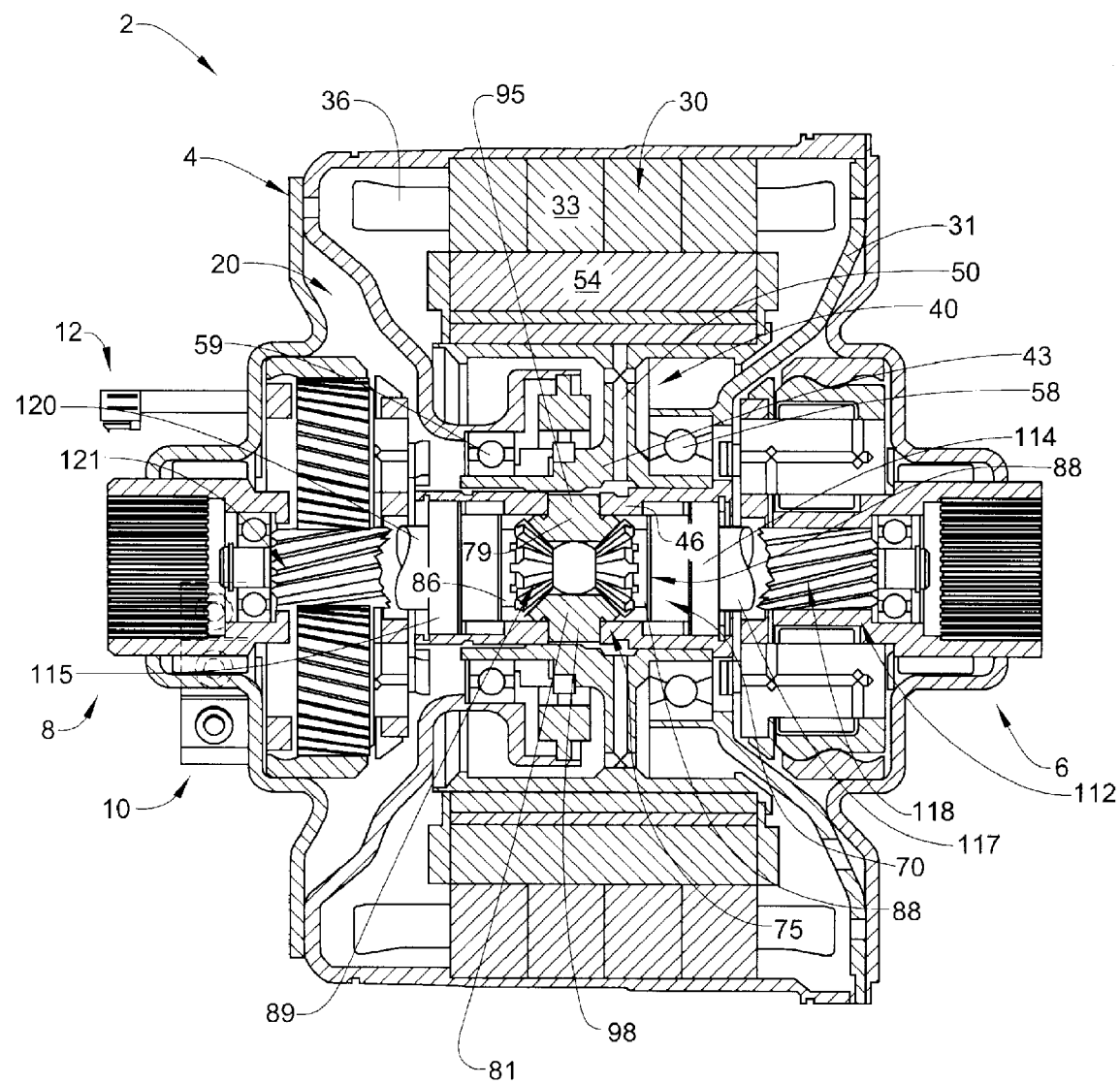
FIG. 2 depicts a cross-sectional view of the transmission member including the differential gear set assembled in accordance with an exemplary embodiment.

With reference to FIGS. 1 and 2, a transmission member constructed in accordance with an exemplary embodiment is indicated generally at 2. Transmission member 2 includes a housing 4 having a first output hub 6 and a second output hub 8. First and second output hubs 6 and 8 provide an interface to corresponding first and second drive wheels (not shown). Transmission member 2 is also shown to include electric power terminals 10 and a signal or sensor connector 12. As will be discussed more fully below, power terminals 10 and sensor connector 12 are electrically connected to an electric motor 20 arranged within housing 4.

As best shown in FIG. 2, electric motor 20 includes a stator assembly 30 having a stator housing 31. A stator core 33 is arranged within stator housing 31. Stator core 33 is surrounded by a plurality of stator windings 36 that are electrically connected to power terminals 10. Electric motor 20 also includes a rotor assembly 40 that is rotatably mounted relative to stator assembly 30. Rotor assembly 40 includes a hub portion 43 that defines, at least in part, a gear housing or carrier 46. Hub portion 43 also includes a lamination support element 50 that supports a plurality of rotor laminations 54. Carrier 46 includes a side wall 55 (FIG. 3) upon which is provided external splines 56 configured to provide an interlocking fit that secures carrier 46 to housing 4. Of course, it should be understood that carrier 46 could alternatively include a keyway, or other features that would facilitate an interference fit. Carrier 46 is rotatably supported relative to stator housing 31 by first and second bearings 58 and 59. As will be discussed more fully below, carrier 46 also supports a differential gear assembly 70.

Figure 3:
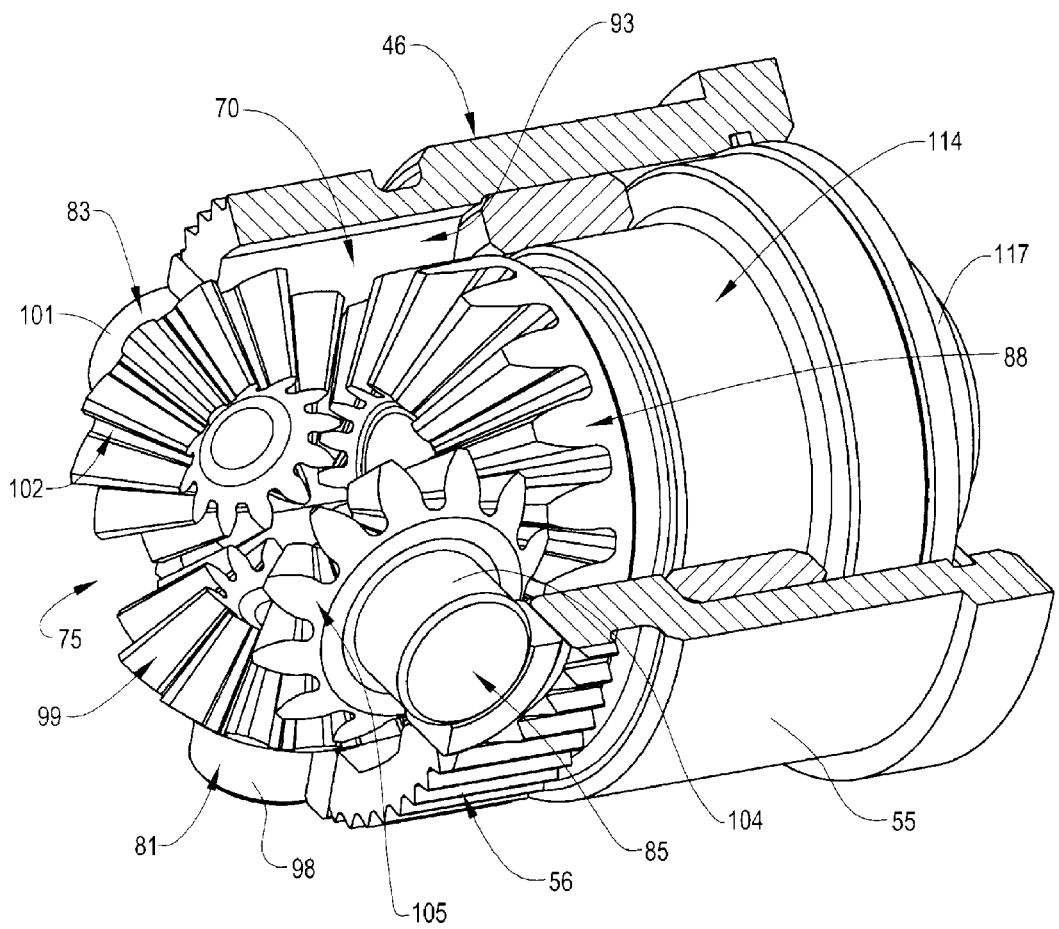
FIG. 3 is a partial perspective view of a carrier including a differential gear set assembled in accordance with an exemplary embodiment.

As best shown in FIG. 3, differential gear assembly 70 includes differential gear set 75 having a first planet gear 79 (FIG. 2), a second planet gear 81 a third planet gear 83 and a fourth planet gear 85. As will be discussed more fully below, first, second, third, and fourth planet gears 79, 81, 83, and 85 are rotatably mounted to carrier 46.

Figure 5:
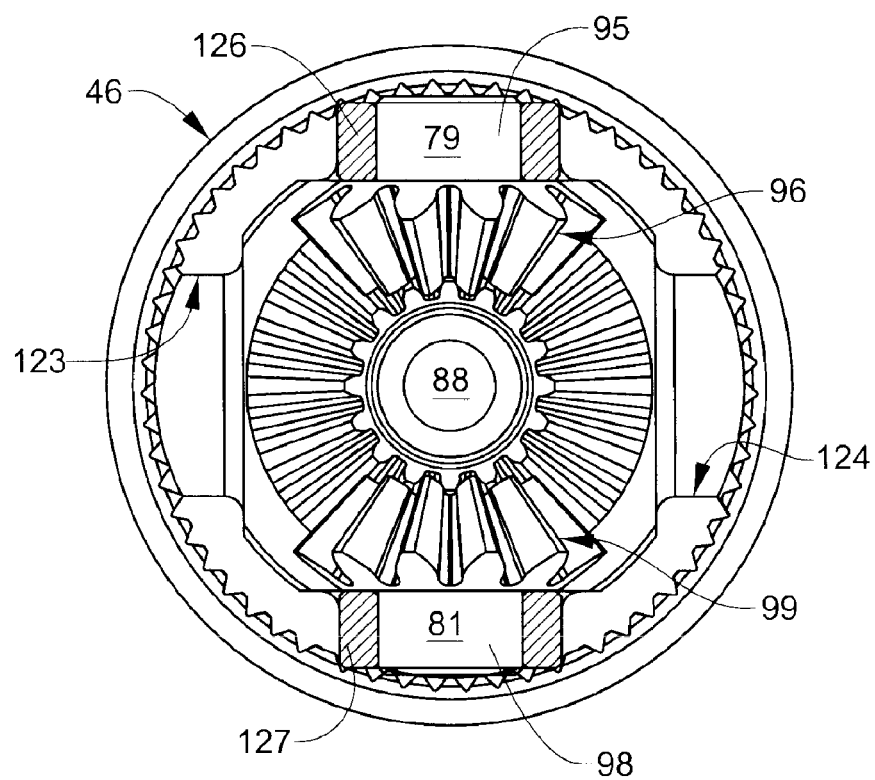
FIG. 5 is an end view of the carrier of FIG. 4 illustrating first and second planet gears installed into the first and second bushings respectively.
Figure 6:
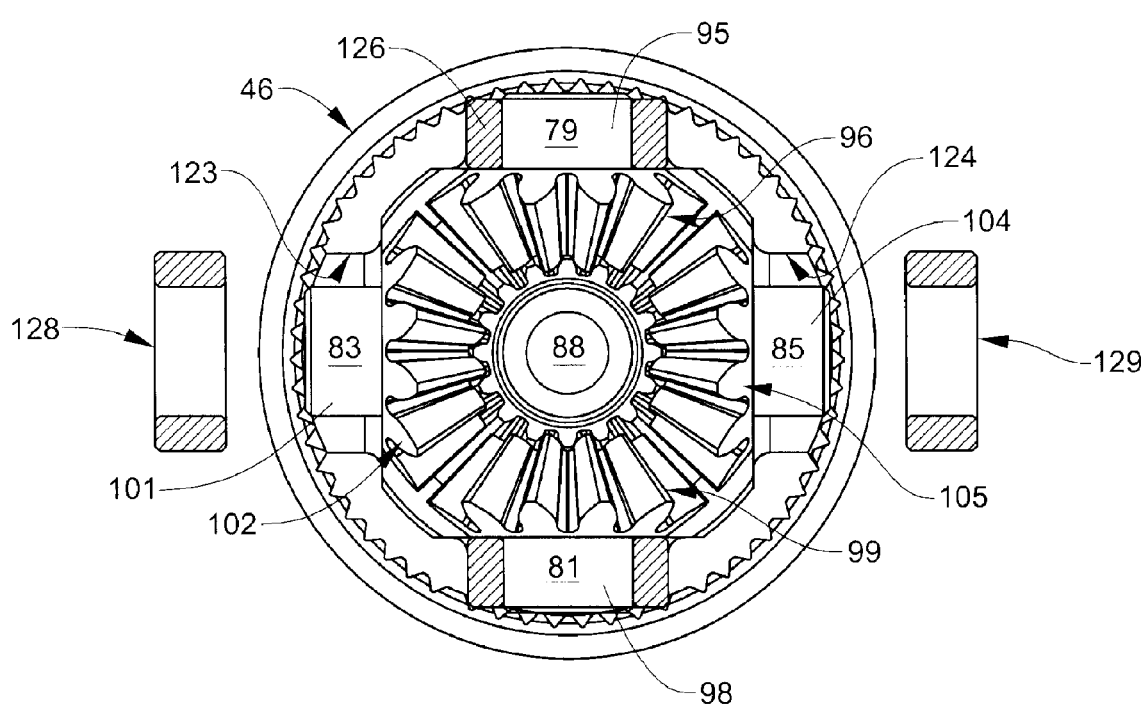
FIG. 6 is an end view of the carrier of FIG. 5 illustrating third and fourth gears installed into side walls of the carrier.
Figure 7:
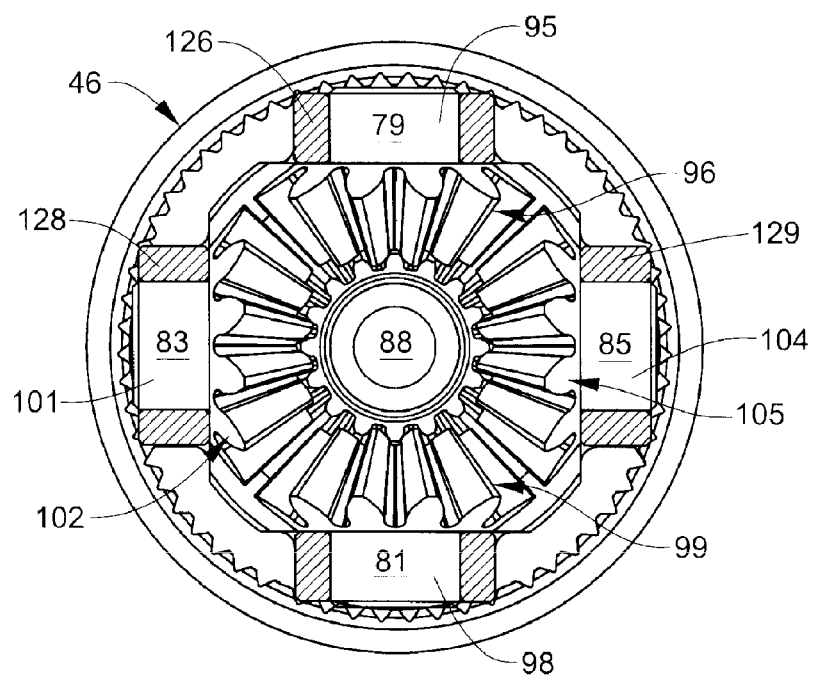
FIG. 7 is an end view of the carrier of FIG. 7 illustrating third and fourth bushings installed into the side walls of the carrier.

Planet gears 79, 81, 83, 85, are operatively engaged with first and second side gears 88 and 89 and are arranged in an interior portion 93 of carrier 46. First planet gear 79 includes a first planet gear shaft 95 and a first plurality of planet gear teeth 96 (FIG. 5). Similarly, second planet gear 81 includes a second planet gear shaft 98 and a second plurality of planet gear teeth 99 (FIG. 5), third planet gear 83 includes a third planet gear shaft 101 and a third plurality of planet gear teeth 102 (FIG. 6), and fourth planet gear 85 includes a fourth planet gear shaft 104 and a fourth plurality of planet gear teeth 105 (FIG. 6). In the embodiment shown, differential gear set includes a first output member 114 and a second output member 115. First output member 114 includes a first output shaft 117 that is operatively connected to a first output gear 118. First output gear 118 defines a side gear (not separately labeled). Second output member 115 includes a second output shaft 120 that is operatively connected to a second output gear 121 that establishes a second side gear (also not separately labeled). Differential gear set 75 enables first and second output members 114 and 115 to rotate at different rates such as during vehicle turns.

Figure 4:
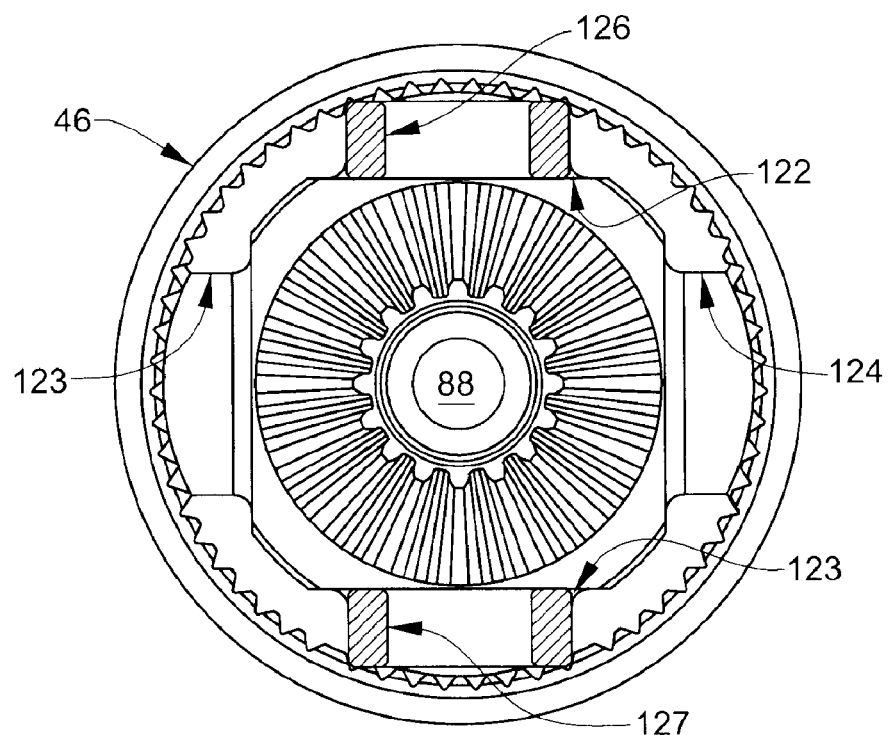
FIG. 4 is an end view of the carrier of FIG. 3 showing first and second planet gear bushings installed into sidewalls of the carrier.

Reference will now follow to FIGS. 4-7 in describing a method of assembling differential gear set 75 into carrier 46. As best shown in FIG. 4, carrier 46 includes a plurality of bushing receptors 122-124 arranged substantially perpendicularly relative to one another. Bushing receptor 122 is provided with a first bushing 126 and bushing receptor 123 is provided with a second bushing 127. First and second bushings 126 and 127 are press-fit into bushing receptors 122 and 123. More specifically, there exists an interference fit between first and second bushings 126 and 127 and bushing receptors 122 and 123 such that insertion requires application of a force. Once first and second bushings 126 and 127 are installed, first and second planet gears are mounted to carrier 46 such as shown in FIG. 5. More specifically, first planet gear shaft 95 is inserted into a shaft receiving opening (not separately labeled) of first bushing 126. Similarly, second planet gear 81 is inserted into a shaft receiving opening (not separately labeled) of second bushing 127.

After installing first and second planet gears 79 and 81, third planet gear 83 is positioned within interior portion 93 and third planet gear shaft 101 is passed into bushing receptor 123. Likewise, fourth planet gear 85 is inserted into interior portion 93 and fourth planet gear shaft is passed into bushing receptor 124. At this point, third plurality of planet gear_teeth 102 and the fourth plurality of planet gear teeth 105 are inter-engaged with the first plurality of planet gear teeth 96, and the second plurality of planet gear teeth 99 as shown in FIG. 6. Once in position, third bushing 128 is fit into bushing receptor 123 and about third planet gear shaft 101, and bushing 129 is fitted into bushing receptor 124 and about fourth planet gear shaft 104. Inserting third and fourth planet gears 83 and 85 before mounting the corresponding bushings 128 and 129 provides any necessary clearance required for proper assembly. Once all planet gears 79, 81, 83, and 85 are in place, first and second side gears 88 and 89 are positioned into interior portion 93 of carrier 46 and engaged with first, second, third and fourth pluralities of planet gear teeth 96, 99, 102 and 105.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of assembling a differential gear set, the method comprising:
    installing a first bushing into a bushing receptor formed in a side wall of a carrier;
    installing a second bushing into a bushing receptor formed in the side wall of the carrier;
    inserting a first planet gear into an interior portion of the carrier, the first planet gear including a first planet gear shaft and a first plurality of planet gear teeth;
    guiding the first planet gear shaft into the first bushing;
    inserting a second planet gear into the interior portion of the carrier, the second planet gear including a second planet gear shaft and a second plurality of planet gear teeth;
    guiding the second planet gear shaft into the second bushing;
    inserting a third planet gear into the interior portion of the carrier, the third planet gear including a third planet gear shaft and a third plurality of planet gear teeth;
    passing the third planet gear shaft into a third bushing receptor formed in the side wall of the carrier;
    inserting a fourth plant gear into the interior portion of the housing, the fourth planet gear including a fourth planet gear shaft and a fourth plurality of planet gear teeth;
    passing the fourth planet gear shaft into a fourth bushing receptor formed in the side wall of the housing; and
    installing a third bushing into the third bushing receptor about the third planet gear shaft and a fourth bushing into the fourth bushing receptor about the fourth planet gear shaft to establish a differential gear set.

2. The method of claim 1, wherein installing the first bushing into the first bushing receptor includes press-fitting the first bushing into the first bushing receptor.

3. The method of claim 1, wherein fitting the second bushing into the second bushing receptor includes press-fitting the second bushing into the second bushing receptor arranged directly opposite to the first bushing receptor.

4. The method of claim 1, wherein installing the fourth bushing into the fourth bushing receptor includes press-fitting the fourth bushing into the fourth bushing receptor arranged directly opposite to the third bushing receptor.

5. The method of claim 1, wherein installing the third bushing into the third bushing receptor includes press-fitting the third bushing into the third bushing receptor.

6. The method of claim 1, further comprising: inter-engaging the third plurality of planet gear teeth with the first plurality of planet gear teeth and the second plurality of gear planet teeth.

7. The method of claim 6, further comprising: inter-engaging the fourth plurality of gear planet teeth with the first plurality of planet gear teeth and the second plurality of planet gear teeth.

8. The method of claim 7, further comprising: installing a first output member including a first plurality of output gear teeth into the interior portion of the carrier.

9. The method of claim 8, further comprising: inter-engaging the first plurality of output gear teeth with the first plurality of planet gear teeth, the second plurality of planet gear teeth, the third plurality of planet gear teeth and the fourth plurality of planet gear teeth.

10. The method of claim 8, further comprising: installing a second output member including a second plurality of output gear teeth into the interior portion of the carrier.

11. The method of claim 10, further comprising: inter-engaging the second plurality of output gear teeth with the first plurality of planet gear teeth, the second plurality of planet gear teeth, the third plurality of planet gear teeth and the fourth plurality of planet gear teeth.

12. The method of claim 1, further comprising: installing the differential gear set into a rotor assembly of an electric machine.

* * * * *